United States Patent
Lemmers, Jr.

(10) Patent No.: US 12,498,036 B2
(45) Date of Patent: Dec. 16, 2025

(54) IDG GOVERNOR ROTATING SLEEVE

(71) Applicant: Hamilton Sundstrand Corporation, Charlotte, NC (US)

(72) Inventor: Glenn C. Lemmers, Jr., Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 342 days.

(21) Appl. No.: 18/177,498

(22) Filed: Mar. 2, 2023

(65) Prior Publication Data

US 2024/0295262 A1 Sep. 5, 2024

(51) Int. Cl.
*F16H 57/04* (2010.01)
*B64D 27/24* (2024.01)
*F16H 1/06* (2006.01)
*H02K 7/18* (2006.01)

(52) U.S. Cl.
CPC ........... *F16H 57/043* (2013.01); *B64D 27/24* (2013.01); *F16H 1/06* (2013.01); *H02K 7/1823* (2013.01)

(58) Field of Classification Search
CPC ......... F16H 1/06; F16H 57/043; B64D 27/24; H02K 7/1823
See application file for complete search history.

(56) References Cited

U.S. PATENT DOCUMENTS

| 3,365,981 | A  | * | 1/1968  | Gantzer ............... F16H 48/11 475/77 |
| 3,576,143 | A  | * | 4/1971  | Baits ................... H02K 7/1807 475/159 |
| 3,786,696 | A  | * | 1/1974  | Aleem ................. H02P 9/08 290/46 |
| 11,280,377 | B1 | * | 3/2022  | Kimes .................. F16H 63/304 |
| 2010/0283358 | A1 | * | 11/2010 | Ganong ................ F16C 3/02 29/598 |
| 2016/0146243 | A1 | * | 5/2016  | Campbell ............ F04B 1/2014 464/179 |
| 2016/0146244 | A1 | * | 5/2016  | Campbell ............ F16C 33/585 464/183 |
| 2019/0219041 | A1 |   | 7/2019  | Hochstetler et al. |
| 2022/0049764 | A1 | * | 2/2022  | Lewis .................. F16H 57/043 |
| 2024/0117876 | A1 | * | 4/2024  | Hall .................... F16H 57/08 |

OTHER PUBLICATIONS

Extended European Search Report for EP Application No. 24160950.2; Issue Date, Jul. 22, 2024.

* cited by examiner

*Primary Examiner* — Anna M Momper
*Assistant Examiner* — Mark K Buse
(74) *Attorney, Agent, or Firm* — CANTOR COLBURN LLP

(57) ABSTRACT

A governor of an integrated drive generator includes a housing, and a rotating sleeve extending at least partially through a housing opening in the housing. The rotating sleeve is configured to rotate about a sleeve axis. A gear is secured to the rotating sleeve and rotatable therewith. The gear is located at a sleeve tip of the rotating sleeve outside of the housing. One or more lubricant drain openings are located at a tip surface of the rotating sleeve. The one or more lubricant drain openings are configured to drain a flow of lubricant from the governor.

19 Claims, 8 Drawing Sheets

IDG GOVERNOR ROTATING SLEEVE

BACKGROUND

Exemplary embodiments pertain to the art of integrated drive generators (IDG's) of aircraft power systems. In particular, the present disclosure relates to lubrication of IDG's.

IDG's are utilized in aircraft to provide electrical power to aircraft systems, utilizing a generator operably connected to an aircraft propulsion system, such as a gas turbine engine. The IDG takes variable speed energy from the gas turbine engine and generates electrical energy via a constant speed generator portion of the IDG. The IDG further uses a constant speed drive, or governor, to transform the variable speed rotational energy provided by the gas turbine engine into constant speed rotational energy usable by the generator.

The IDG requires lubrication by oil to maintain operation and extend its useful service life. Ineffective or insufficient lubrication of the IDG and its components results in increased wear of the components.

BRIEF DESCRIPTION

In one embodiment, a governor of an integrated drive generator includes a housing, and a rotating sleeve extending at least partially through a housing opening in the housing. The rotating sleeve is configured to rotate about a sleeve axis. A gear is secured to the rotating sleeve and rotatable therewith. The gear is located at a sleeve tip of the rotating sleeve outside of the housing. One or more lubricant drain openings are located at a tip surface of the rotating sleeve. The one or more lubricant drain openings are configured to drain a flow of lubricant from the governor.

Additionally or alternatively, in this or other embodiments a stationary sleeve is located in the housing opening radially outboard of the rotating sleeve defining an interface between the stationary sleeve and the rotating sleeve.

Additionally or alternatively, in this or other embodiments one or more lubricant injection openings are located in the stationary sleeve and are configured to direct the flow of lubricant toward the interface.

Additionally or alternatively, in this or other embodiments one or more lubricant passages are located in the rotating sleeve to direct the flow of lubricant into an interior of the rotating sleeve.

Additionally or alternatively, in this or other embodiments a retaining pin is installed into the sleeve tip to secure the gear to the rotating sleeve.

Additionally or alternatively, in this or other embodiments one or more scallops are formed in the retaining pin to at least partially define the one or more lubricant drain openings.

Additionally or alternatively, in this or other embodiments the gear includes a gear hub, and a plurality of gear teeth located radially outboard of the gear hub. The gear hub includes a gear hub opening through which the rotating sleeve at least partially extends.

Additionally or alternatively, in this or other embodiments the gear hub includes one or more gear drain slots formed therein to at least partially define the one or more lubricant drain openings.

Additionally or alternatively, in this or other embodiments one or more drain slots are located in the sleeve tip to at least partially define the one or more lubricant drain openings.

Additionally or alternatively, in this or other embodiments the one or more drain openings are defined by one or more of one or more drain slots defined in the sleeve tip, one or more gear drain slots formed in a gear hub of the gear, and one or more scallops formed in a retaining pin securing the gear to the rotating sleeve.

Additionally or alternatively, in this or other embodiments the one or more drain slots, the one or more gear drain slots and the one or more scallops are circumferentially aligned with respect to the sleeve axis.

In another embodiment, an electrical power system of an aircraft includes an aircraft propulsion system, one or more electrical systems of the aircraft powered by the aircraft propulsion system, and an integrated drive generator (IDG) operably connected to the aircraft propulsion system to generate electrical energy from rotational energy of the aircraft propulsion system. The IDG includes a generator portion and a governor. The governor includes a housing, and a rotating sleeve extending at least partially through a housing opening in the housing. The rotating sleeve is configured to rotate about a sleeve axis. A gear is secured to the rotating sleeve and rotatable therewith. The gear is located at a sleeve tip of the rotating sleeve outside of the housing. One or more lubricant drain openings are located at a tip surface of the rotating sleeve. The one or more lubricant drain openings are configured to drain a flow of lubricant from the governor.

Additionally or alternatively, in this or other embodiments a stationary sleeve is located in the housing opening radially outboard of the rotating sleeve defining an interface between the stationary sleeve and the rotating sleeve.

Additionally or alternatively, in this or other embodiments one or more lubricant injection openings are located in the stationary sleeve and are configured to direct the flow of lubricant toward the interface.

Additionally or alternatively, in this or other embodiments one or more lubricant passages are located in the rotating sleeve to direct the flow of lubricant into an interior of the rotating sleeve.

Additionally or alternatively, in this or other embodiments a retaining pin is installed into the sleeve tip to secure the gear to the rotating sleeve.

Additionally or alternatively, in this or other embodiments one or more scallops are formed in the retaining pin to at least partially define the one or more lubricant drain openings.

Additionally or alternatively, in this or other embodiments the gear includes a gear hub, and a plurality of gear teeth located radially outboard of the gear hub. The gear hub includes a gear hub opening through which the rotating sleeve at least partially extends.

Additionally or alternatively, in this or other embodiments the gear hub includes one or more gear drain slots formed therein to at least partially define the one or more lubricant drain openings.

Additionally or alternatively, in this or other embodiments or more drain slots are located in the sleeve tip to at least partially define the one or more lubricant drain openings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
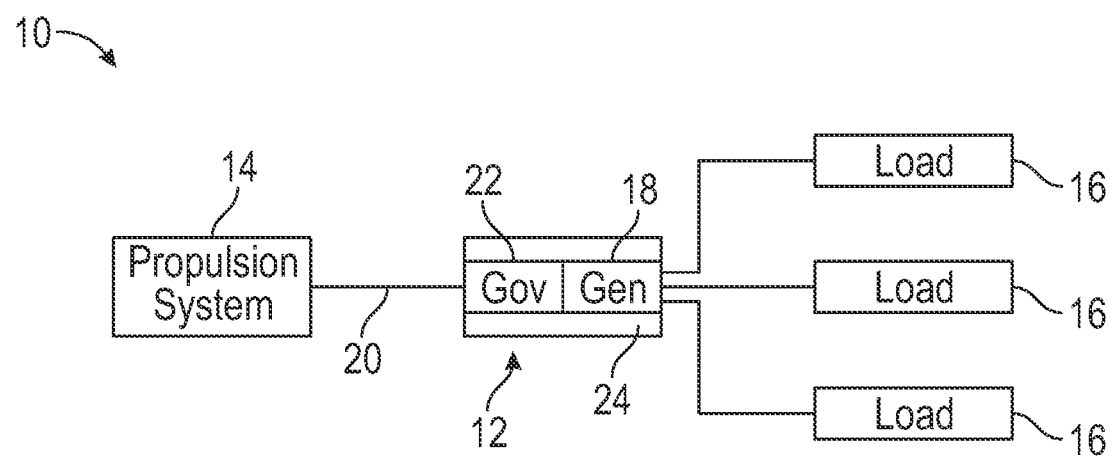
FIG. 1 is a schematic illustration of an electrical power system of an aircraft.

Referring to FIG. 1, shown is a schematic illustration of an electrical power system 10 of an aircraft. The electrical power system 10 includes an integrated drive generator (IDG) 12 operably connected to an aircraft propulsion system, for example, gas turbine engine 14 and operably connected to one or more electrical loads 16 of the aircraft. The IDG 12 utilizes rotational energy from the gas turbine engine 14 and generates electrical power from the rotational energy. The electrical power is output from the IDG 12 to the one or more electrical loads 16, which may include electrical systems and components of the aircraft, and/or may include an electrical storage such as a battery unit.

Figure 2:
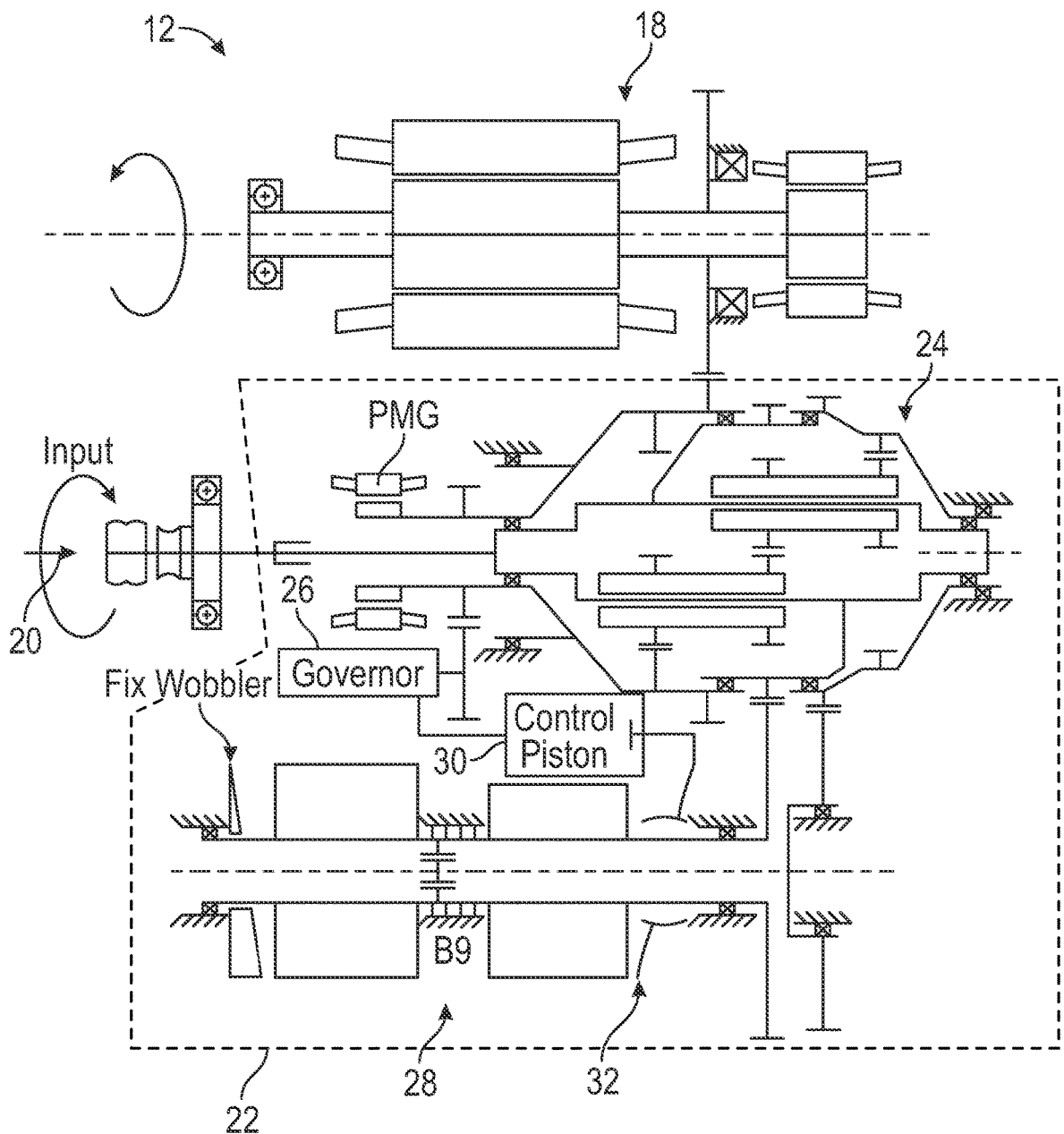
FIG. 2 is a schematic illustration of an embodiment of an integrated drive generator (IDG)

Referring now to FIG. 2, the IDG 12 includes a generator portion 18, which in some embodiments is a permanent magnet generator which uses rotational energy to generate electrical power. The gas turbine engine 14 provides variable speed rotational energy along a power takeoff shaft 20 connecting the gas turbine engine 14 to the IDG 12. To convert the variable speed rotational energy of the gas turbine engine 14 into a constant rotational speed usable by the generator portion 18, the IDG 12 further includes a constant speed drive 22, which converts the variable speed rotational energy input into the IDG 12 into constant speed rotational energy which is output to the generator portion 18 for generation of electrical power. In some embodiments, constant speed drive (CSD) 22 includes an epicyclic differential 24, a governor 26, and a hydraulic unit 28. The governor 26 is operably connected to and driven by a constant speed output side of the differential 24, and ports hydraulic pressure to a control piston 30, which is used to change a position of a variable wobbler 32. This change in position of the variable wobbler 32 controls the constant speed output from the CSD 22 to the generator 18. In some embodiments, such as illustrated in FIG. 1, the generator portion 18 and the CSD 22 are located in a common IDG housing 38.

Figure 3:
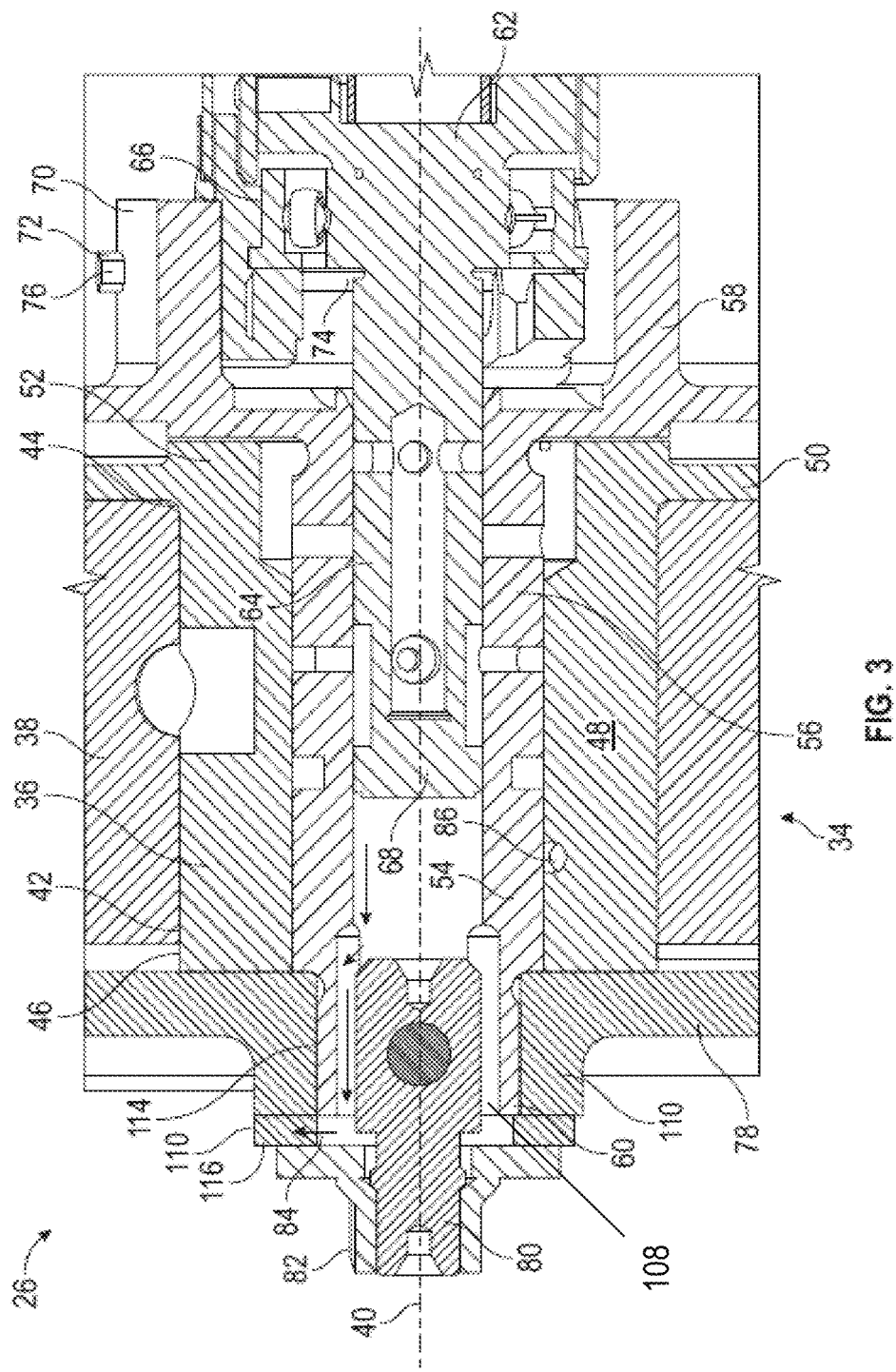
FIG. 3 is a partial cross-section view of an embodiment of a governor of an integrated drive generator (IDG)
Figure 4:
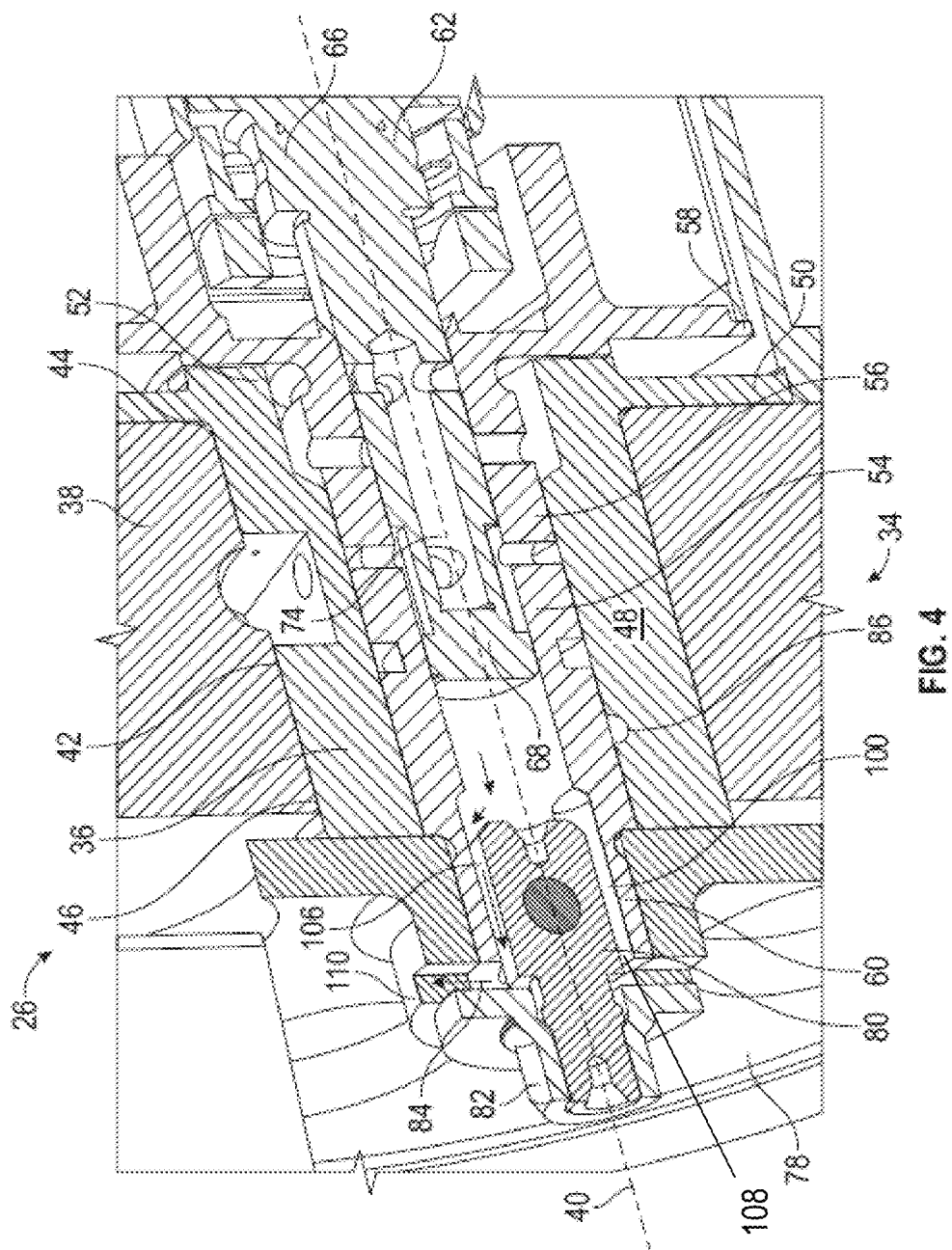
FIG. 4 is another partial cross-sectional view of an embodiment of a governor of an IDG.

Referring now to FIGS. 3 and 4, shown is a partial cross-sectional view of an embodiment of a governor 26. More specifically, illustrated is a gear assembly 34 of the governor 26. A hollow stationary sleeve 36 located in the housing 38 at a governor axis 40. The stationary sleeve 36 extends into a housing opening 42 in the housing 38 having a first opening end 44 and a second opening end 46 opposite the first opening end 44. In some embodiments, the stationary sleeve 36 includes a stationary sleeve body 48 and stationary sleeve flange 50 extending radially outwardly from the sleeve body 48 at a first sleeve end 52 located at the first opening end 44 to locate the stationary sleeve 36 in the housing opening 42.

A hollow rotating sleeve 54 is installed into the stationary sleeve 36 and is configured to rotate about the governor axis 40 relative to the stationary sleeve 36. The rotating sleeve 54 includes a sleeve body 56 extending from a sleeve base 58 to a sleeve tip 60 opposite the sleeve base 58. A stem 62 is installed into the rotating sleeve 54 from the sleeve base 58. The stem 62 includes an oil metering body 64 extending from a stem base 66 to a stem tip 68 opposite the stem base 66. In some embodiments the sleeve body 56 includes a sleeve clevis 70 having a clevis opening 72 and the stem base 66 includes a base opening 74 that aligns with the clevis opening 72.

A gear 78 is installed onto the sleeve tip 60 at the second opening end 46. The gear 78 is retained by a retaining pin 80 installed into the sleeve tip 60 and a cap nut 82 installed to the retaining pin 80 over the gear 78.

To lubricate the components of the governor 26, a flow of lubricant 84 such as oil or other fluid is circulated therethrough. The flow of lubricant 84 is injected into an interior of the stationary sleeve 36 via one or more injection openings 86 in the stationary sleeve body 48. The flow of lubricant 84 lubricates an interface between the stationary sleeve body 48 and the sleeve body 56 of the rotating sleeve 54, and drains out of the governor 26 generally at the sleeve tip 60 via one or more drain openings as will be described below.

Figure 5:
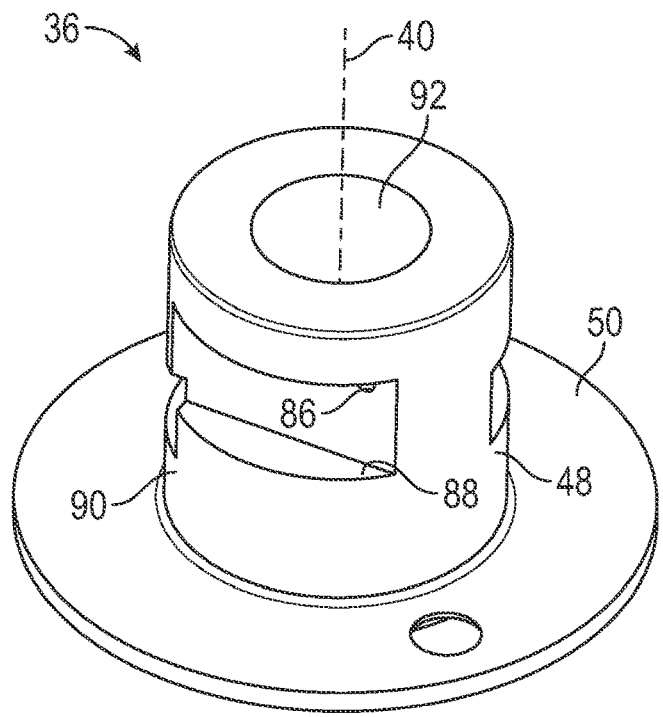
FIG. 5 is a perspective view of an embodiment of a stationary sleeve of a governor.

Referring to FIG. 5, illustrated is an embodiment of a stationary sleeve 36. The stationary sleeve 36 includes the stationary sleeve body 48 and the stationary sleeve flange 50 extending radially outwardly from the stationary sleeve body 48 at the first sleeve end 44. In some embodiments, the injection openings 86 are positioned in one or more stationary sleeve scallops 88 located along the stationary sleeve body 48. The stationary sleeve scallops 88 are formed as recesses in an outer body surface 90 of the stationary sleeve body 48. The flow of lubricant 84 enters the interior of the stationary sleeve 36 through the one or more injection openings 86 and exits through a second sleeve end 92 of the stationary sleeve 36.

Figure 6:
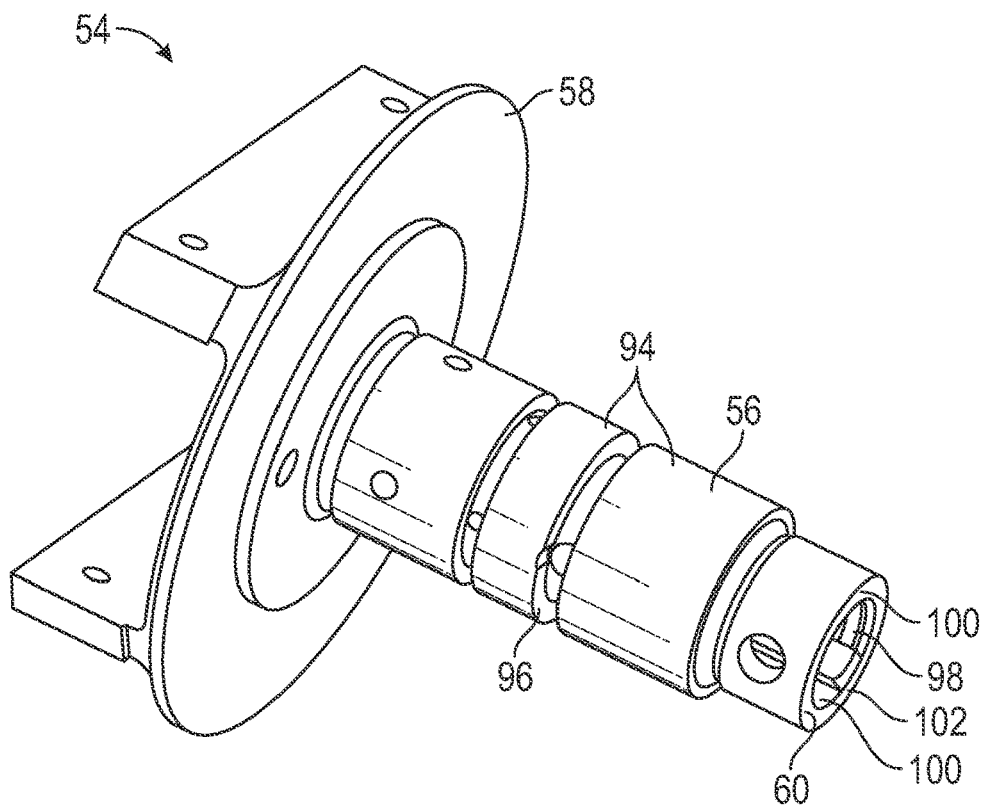
FIG. 6 is a perspective view of an embodiment of a rotating sleeve of a governor.

Referring now to FIG. 6, illustrated is an embodiment of a rotating sleeve 54. The rotating sleeve 54 includes the sleeve body 56 extending from the sleeve base 58 to the sleeve tip 60 opposite the sleeve base 58. The sleeve body 56 is hollow and includes a plurality of body ribs 94 extending circumferentially around the sleeve body 56. One or more lubricant passages 96 are located between axially adjacent sleeve ribs 94 to direct the flow lubricant 84 into a rotating sleeve interior 98 of the rotating sleeve 54. The flow of lubricant 84 exits the rotating sleeve interior 98 at the sleeve tip 60. The sleeve tip 60 includes one or more drain slots 100 formed in a tip surface 102 of the rotating sleeve 54. In some embodiments, the sleeve tip 60 includes two drain slots 100 located 180 degrees apart.

Figure 7:
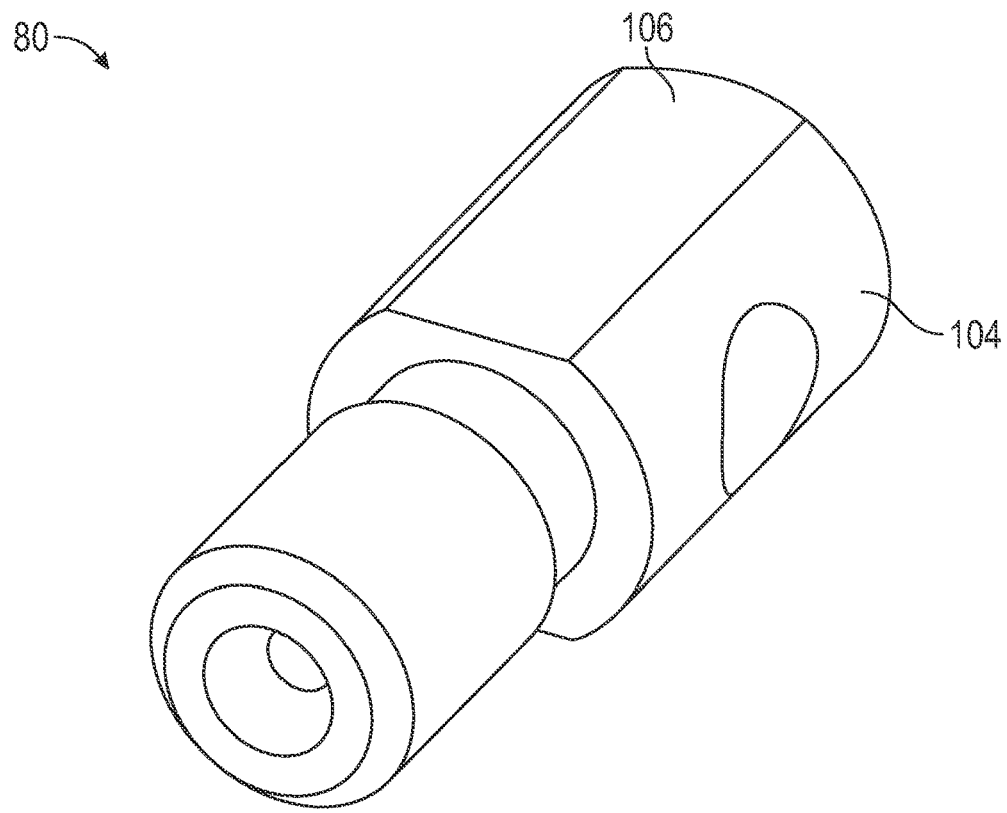
FIG. 7 is a perspective view of an embodiment of a retaining pin of a governor.
Figure 8:
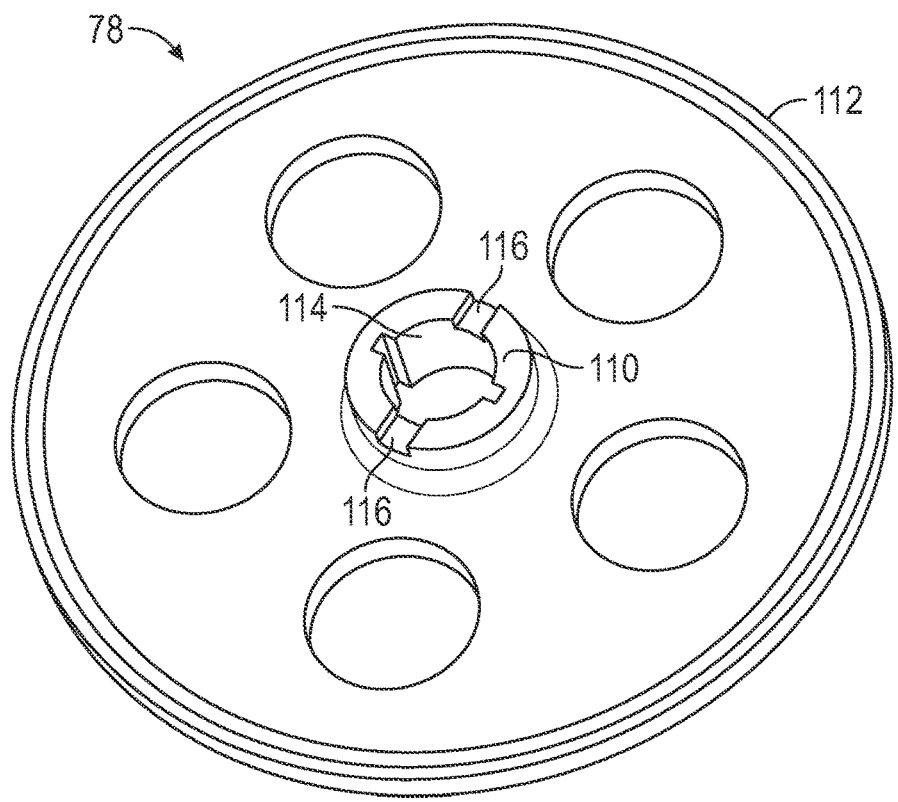
FIG. 8 is a perspective view of an embodiment of a gear of a governor.
Figure 9:
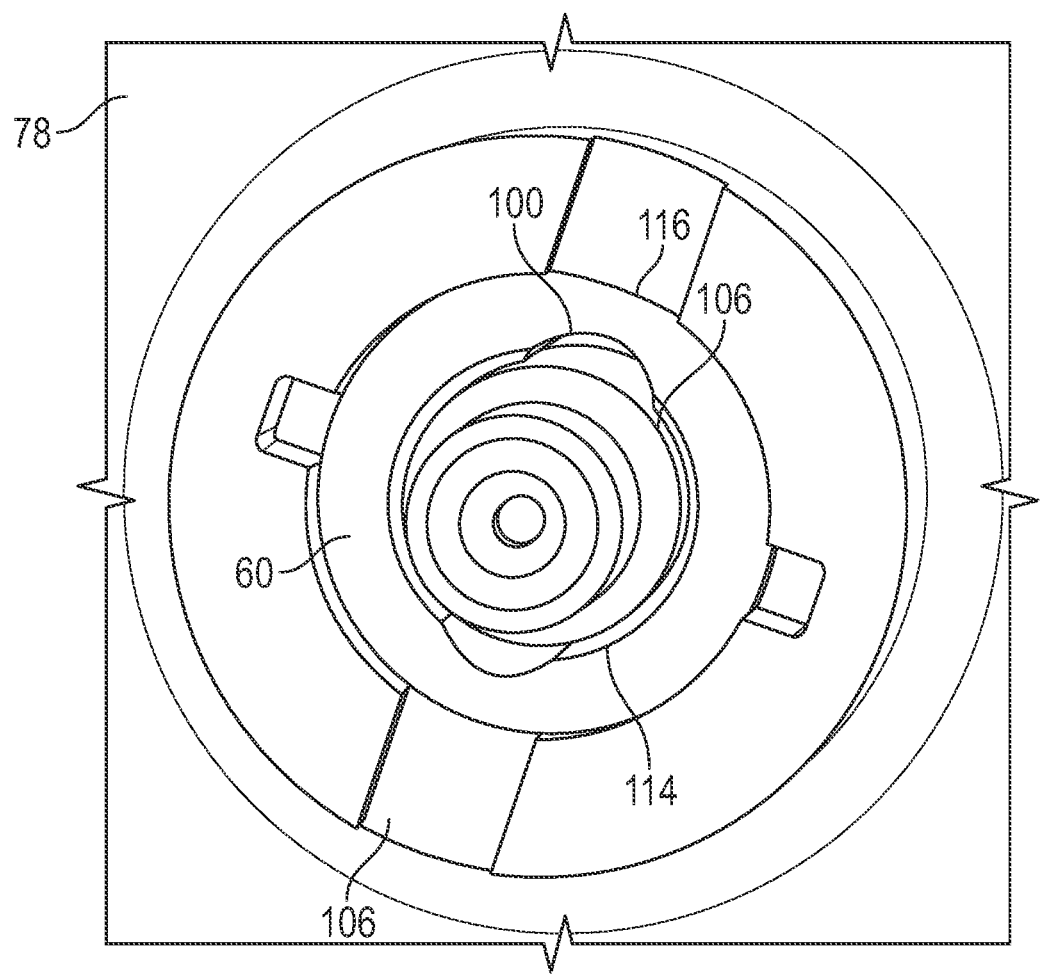
FIG. 9 is an illustration of an embodiment of a lubricant drain opening of a governor.
Figure 9:
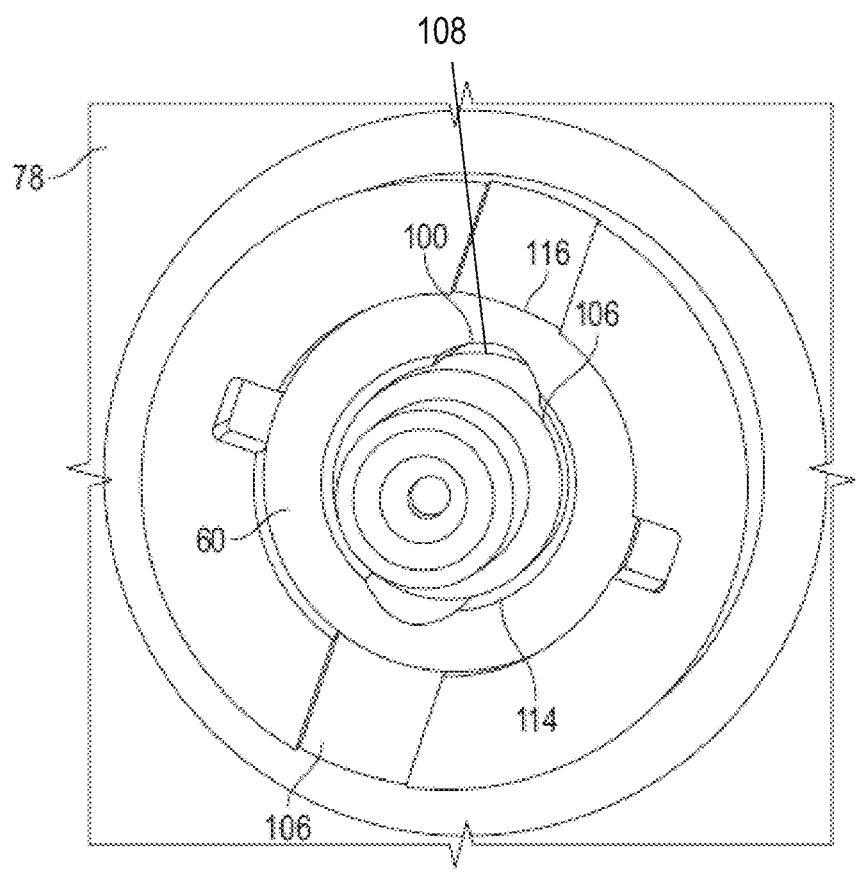

Referring now to FIG. 7, illustrated is an embodiment of the retaining pin 80. The retaining pin 80 includes a pin body 104 having one or more pin scallops 106 formed therein. The pin scallops 106 are circumferentially aligned with the drain slots 100, as illustrated in FIG. 9, to define drain openings 108. Referring now to FIG. 8, the gear 78 includes a gear hub 110 and a plurality of gear teeth 112. The gear 78 further includes a gear hub opening 114 through which the retaining pin 80 extends, as illustrated in FIG. 3. Referring again to FIG. 8, one or more gear drain slots 116 are located at the gear hub 110. Referring again to FIGS. 3 and 9, the gear drain slots 116 are circumferentially aligned with the drain slots 100 and the pin scallops 106 to define the drain openings 108.

The configuration disclosed herein improves the flow of lubricant 84 toward the sleeve tip 60 by locating the drain openings 108 at the sleeve tip 60 thus improving the lubrication of the interface between the stationary sleeve 36 and the rotating sleeve 54. This reduces wear of the stationary sleeve 36 and the rotating sleeve 54 to extend the service life of the components and to improve performance of the IDG 12.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A governor of an integrated drive generator, comprising:
    a housing;
    a rotating sleeve extending at least partially through a housing opening in the housing, the rotating sleeve configured to rotate about a sleeve axis;
    a gear secured to the rotating sleeve and rotatable therewith, the gear disposed at a sleeve tip of the rotating sleeve outside of the housing; and
    one or more lubricant drain openings disposed at a tip surface of the rotating sleeve, the one or more lubricant drain openings configured to drain a flow of lubricant from the governor;
    wherein the one or more lubricant drain openings are defined by one or more of:
        one or more drain slots defined in the sleeve tip;
        one or more gear drain slots formed in a gear hub of the gear; and
        one or more scallops formed in a retaining pin securing the gear to the rotating sleeve.

2. The governor of claim 1, further comprising a stationary sleeve disposed in the housing opening radially outboard of the rotating sleeve defining an interface between the stationary sleeve and the rotating sleeve.

3. The governor of claim 2, further comprising one or more lubricant injection openings in the stationary sleeve configured to direct the flow of lubricant toward the interface.

4. The governor of claim 1, further comprising one or more lubricant passages in the rotating sleeve to direct the flow of lubricant into an interior of the rotating sleeve.

5. The governor of claim 1, wherein the one or more lubricant drain openings includes the one or more scallops formed in the retaining pin to at least partially define the one or more lubricant drain openings.

6. The governor of claim 1, wherein the gear includes:
    a gear hub; and
    a plurality of gear teeth disposed radially outboard of the gear hub;
    wherein the gear hub includes a gear hub opening through which the rotating sleeve at least partially extends.

7. The governor of claim 6, wherein the one or more lubricant drain openings includes the one or more gear drain slots formed therein to at least partially define the one or more lubricant drain openings.

8. The governor of claim 1, wherein the one or more lubricant drain openings includes the one or more drain slots defined in the sleeve tip to at least partially define the one or more lubricant drain openings.

9. The governor of claim 1, wherein the one or more drain slots, the one or more gear drain slots and the one or more scallops are circumferentially aligned with respect to the sleeve axis.

10. An electrical power system of an aircraft, comprising:
    an aircraft propulsion system;
    one or more electrical systems of the aircraft powered by the aircraft propulsion system; and
    an integrated drive generator (IDG) operably connected to the aircraft propulsion system to generate electrical energy from rotational energy of the aircraft propulsion system, the IDG including:
        a generator portion; and
        a governor, the governor including:
            a housing;
            a rotating sleeve extending at least partially through a housing opening in the housing, the rotating sleeve configured to rotate about a sleeve axis;
            a gear secured to the rotating sleeve and rotatable therewith, the gear disposed at a sleeve tip of the rotating sleeve outside of the housing;
            one or more lubricant drain openings disposed at a tip surface of the rotating sleeve, the one or more lubricant drain openings configured to drain a flow of lubricant from the governor;
            a retaining pin installed into the sleeve tip to secure the gear to the rotating sleeve; and
            one or more scallops formed in the retaining pin to at least partially define the one or more lubricant drain openings.

11. The electrical power system of claim 10, further comprising a stationary sleeve disposed in the housing opening radially outboard of the rotating sleeve defining an interface between the stationary sleeve and the rotating sleeve.

12. The electrical power system of claim 11, further comprising one or more lubricant injection openings in the stationary sleeve configured to direct the flow of lubricant toward the interface.

13. The electrical power system of claim 10, further comprising one or more lubricant passages in the rotating sleeve to direct the flow of lubricant into an interior of the rotating sleeve.

14. An electrical power system of an aircraft, comprising:
- an aircraft propulsion system;
- one or more electrical systems of the aircraft powered by the aircraft propulsion system; and
- an integrated drive generator (IDG) operably connected to the aircraft propulsion system to generate electrical energy from rotational energy of the aircraft propulsion system, the IDG including:
  - a generator portion; and
  - a governor, the governor including:
    - a housing;
    - a rotating sleeve extending at least partially through a housing opening in the housing, the rotating sleeve configured to rotate about a sleeve axis;
    - a gear secured to the rotating sleeve and rotatable therewith, the gear disposed at a sleeve tip of the rotating sleeve outside of the housing; and
    - one or more lubricant drain openings disposed at a tip surface of the rotating sleeve, the one or more lubricant drain openings configured to drain a flow of lubricant from the governor;
- wherein the gear includes:
  - a gear hub; and
  - a plurality of gear teeth disposed radially outboard of the gear hub;
  - wherein the gear hub includes a gear hub opening through which the rotating sleeve at least partially extends.

15. The electrical power system of claim 14, wherein the gear hub includes one or more gear drain slots formed therein to at least partially define the one or more lubricant drain openings.

16. The electrical power system of claim 14, further comprising a stationary sleeve disposed in the housing opening radially outboard of the rotating sleeve defining an interface between the stationary sleeve and the rotating sleeve.

17. The electrical power system of claim 16, further comprising one or more lubricant injection openings in the stationary sleeve configured to direct the flow of lubricant toward the interface.

18. An electrical power system of an aircraft, comprising:
- an aircraft propulsion system;
- one or more electrical systems of the aircraft powered by the aircraft propulsion system; and
- an integrated drive generator (IDG) operably connected to the aircraft propulsion system to generate electrical energy from rotational energy of the aircraft propulsion system, the IDG including:
  - a generator portion; and
  - a governor, the governor including:
    - a housing;
    - a rotating sleeve extending at least partially through a housing opening in the housing, the rotating sleeve configured to rotate about a sleeve axis;
    - a gear secured to the rotating sleeve and rotatable therewith, the gear disposed at a sleeve tip of the rotating sleeve outside of the housing; and
    - one or more lubricant drain openings disposed at a tip surface of the rotating sleeve, the one or more lubricant drain openings configured to drain a flow of lubricant from the governor;
  - further comprising one or more drain slots in the sleeve tip to at least partially define the one or more lubricant drain openings.

19. The electrical power system of claim 18, further comprising one or more lubricant passages in the rotating sleeve to direct the flow of lubricant into an interior of the rotating sleeve.

* * * * *